United States Patent [19]

Brichta et al.

[11] Patent Number: 5,541,262
[45] Date of Patent: Jul. 30, 1996

[54] PROPYLENE POLYMER AND COPOLYMERS GRAFTED WITH VINYLPOLYBUTADIENE AND THEIR PREPARATION PROCESS

[75] Inventors: Corrado Brichta, Milan; Francesco Mascia, Como; Amodio Di Somma, Milan; Gabriele Torregiani, Varese; Antonio Addeo, Novara, all of Italy

[73] Assignee: Centro Sviluppo Settori Impiego S.r.l., Italy

[21] Appl. No.: 466,364

[22] Filed: Jun. 6, 1995

Related U.S. Application Data

[63] Continuation of Ser. No. 974,849, Nov. 10, 1992, abandoned.

[30] Foreign Application Priority Data

Nov. 12, 1991 [IT] Italy ................. MI91A3011

[51] Int. Cl.$^6$ .................. C08F 255/02; C08L 23/10; C08L 9/00
[52] U.S. Cl. .................. 525/313; 525/208; 525/221; 525/232; 525/240; 525/244; 525/286; 525/298; 525/322; 525/914
[58] Field of Search .................. 525/208, 221, 525/232, 286, 298, 301, 313, 914, 240, 244, 322

[56] References Cited

U.S. PATENT DOCUMENTS

| | | | |
|---|---|---|---|
| 3,989,769 | 11/1976 | Bennington | 525/194 |
| 4,111,898 | 9/1978 | Inayoshi et al. | |
| 4,298,706 | 11/1981 | Ueno et al. | |
| 4,476,273 | 10/1984 | Senatore | 525/914 |
| 4,556,695 | 12/1985 | Iznetema | 525/359.6 |
| 4,613,643 | 9/1986 | Nakamura et al. | |
| 4,948,820 | 8/1990 | Addeo et al. | 525/938 |

FOREIGN PATENT DOCUMENTS

| | | |
|---|---|---|
| 2747927 | 11/1979 | Germany. |
| 2937528 | 3/1980 | Germany. |
| 3201683 | 7/1983 | Germany. |
| 3219331 | 12/1983 | Germany. |
| 54-090291 | 7/1979 | Japan. |
| 2116987 | 10/1983 | United Kingdom. |
| 2123004 | 1/1984 | United Kingdom. |

OTHER PUBLICATIONS

Derwent Abstracts for DE 2 747 927, DE 3 219 331, DE 3 201 683, DE 2 937 528.
Chemical Abstracts, vol. 87, No. 16, (1977), Columbus Ohio, U.S.A.; Kimura K. et al. "Thermoplastic Resin Compositions" p. 49; Abstract No. 87:118 760x and JP-A-77, 53,949.
Chemical Abstracts, vol. 86, No. 16, (1977), Columbus Ohio, U.S.A.; Kimura K. et al., "Thermoplastic Compositions" p. 34; Abstract No. 86:107 477p and JP-A-76,127, 145.
European Search Report and Annex dated Dec. 13, 1993.
Translation of Japan 77-53949, Apr. 1977.

*Primary Examiner*—Vasu S. Jagannathan
*Attorney, Agent, or Firm*—Bryan LLP Cave

[57] ABSTRACT

Crystalline propylene (co)polymers modified by grafting with a vinylpolybutadiene having 1,2-structure content of at least 10%.

The (co)polymers are reacted with a liquid vinylpolybutadiene in the presence of a non-peroxidic radical initiator at a temperature in the range 200° to 350° C., the liquid vinylpolybutadiene having a 1,2-structure content of at least 10% and being generally used in amounts within the range 0.5 to 20% by weight.

7 Claims, No Drawings

PROPYLENE POLYMER AND COPOLYMERS GRAFTED WITH VINYLPOLYBUTADIENE AND THEIR PREPARATION PROCESS

This is a continuation of U.S. application Ser. No. 07/974,849, filed Nov. 10, 1992 now abandoned.

The present invention relates to propylene homopolymers and copolymers grafted with 1,2-polybutadienes, and to their manufacture process by reactive transformation.

The invention relates in particular to crystalline propylene polymers and copolymers and to their mixtures, having an isotacticity index higher than 80% subsequently modified by grafting with 0.1–10% by weight of 1,2-polybutadiene.

Another object of the present invention is represented by the (co)polymers of propylene grafted with 1,2-polybutadienes containing either end-chain functional groups such as —OH and —COOH, or internal functional groups such as epoxy and urethane or functionalized monomers such as maleic anhydride, acrylic esters and methacrylic esters.

The (co)polymers modified by grafting with functionalized poly-1,2-butadiene obtained according to the present invention are useful for manufacturing surface modified articles, which are suitable, for painting without need for any pre-treatment such as flame treatment, or capable of promoting the adhesion of metals or other materials.

The radical degradation of crystalline homopolymers and copolymers of propylene, at high temperatures, by means of the use of non-peroxidic initiators, is already known.

According to the Japanese patent Application JP-A-J5 4090-291, brominated and alkylderivaties of 1,2-diphenylethane as free radical initiators have been used for this purpose.

The (co)polymers thus degraded satisfy the requirements of ease of processability, however manufactured articles therefrom do not present satisfactory mechanical properties, in particular as regards impact strength.

The same drawbacks are also faced when the process claimed in U.S. Pat. No. 4,556,695 is employed wherein chlorinated derivative of 1,2-diphenyletane, are used.

Also U.S. Pat. No. 4,948,820 describe the degradation, of (co)polymers of propylene at high temperature in the presence of particular non-peroxidic initiators based on the benzopinacole structure, obtaining products characterized by high melt flow index and controlled-rheology, suitable for injection-moulding, which however do not show acceptable impact strength characteristics.

The modification of crystalline propylene polymers by means of a treatment at 250°–300° C. with polymers or copolymers of α-olefins, such as butene-1, in the presence of peroxides, according to European patent EP 261,786, does not imply any increase in the impact strength of the so modified polymers.

Furthermore, the use of peroxidic initiators, which is essential in such a modification, can cause secondary reactions, such as, for example, a cross-linking of the polymer.

Applicants have surprisingly found that crystalline propylene polymers and copolymers having improved rheological properties in the molten state, and at the sometime improved impact strength properties can be obtained by submitting the above said (co)polymers to a thermal treatment (rearrangement reaction) at a temperature within the range of from about 200° C. to 350° C. with minor amounts of polybutadienes containing 1,2-units (vinylpolybutadiene) in the presence of non-peroxidic free-radical initiators.

In order to prevent a thermoxidative degradation of (co)polymers, the above said reactive transformation process, is carried out in the presence of antioxidants and stabilizers.

NMR analyses show that vinylpolybutadiene is grafted onto the chain of the propylene (co)polymer.

Furthermore the absence of insoluble gels confirms that the (co)polymers is not crosslinked.

The propylene polymers and copolymers used in the process according to the present invention are constituted by propylene homopolymers and propylene copolymers containing at least 20 mol % of propylene.

In particular, they comprise the (co)polymers with index of isotacticity higher than 80%; crystalline copolymers with minor proportions of ($C_1$–$C_{10}$)-olefins, such as ethylene, butene-1, pentene-1; 4-methyl-pentene-1, hexene-1; the high-impact polypropylenic compositions obtained by means of the sequential polymerization of propylene and mixtures thereof with ethylene and/or other α olefins; elastomeric copolymers of ethylene with propylene, and possibly with minor content of a diene; syndiotactic propylene polymers and blends of propylene polymer with LLDPE are also included.

The process is preferably applied to crystalline propylene (co)polymers with values of MFI at 230° C./21.6 N generally comprised within the range from 0.1 to 100 dg/min, preferably from 0.1 to 50.

Vinylpolybutadienes which can be used have at least 10% of 1,2 units. Furthermore, they can contain vinyl moieties bonded to cyclic structures. Preferably, liquid vinylpolybutadienes are used which have a number average molecular weight included within the range from 1,800 to 8,000, and with a content of 1,2-structure included within the range from 10 to 90% the remainder being constituted by 1,4-cis and 1,4-trans structure.

These polymer are generally obtained by means of a process of anionic butadiene polymerization with organic lithium catalysts. They have atactic structure.

However, polybutadienes with a 1,2 isotactic or syndiotactic structure can also be used.

Examples of liquid vinylpolybutadienes available from the market are "Lithenes", manufactured by Revertex Ltd., "NISSO-PB" resins manufactured by Nippon Soda Co. Ltd. and "Nisseki LPB" resins manufactured by Nippon Petrochemicals Ltd.

As already said, vinylpolybutadienes may contain functional groups, which may be in end-chain position, or distributed along polymer chain.

Examples of such polymers are polybutadiene-diol (Polybd-Resins, manufactured by the Company Atochem Inc.), and polybutadienes containing pendant carboxy, ester or epoxy groups (NISSO-PB-Resins manufactured by the company Nippon Soda Co. Ltd, Polymer Division.

The amount of vinylpoliybutadienes used in the process according to the present invention is included within a wide range, such amount depending on the expected application for the final products.

In the case of crystalline propylene (co)polymers, an amount of 20% by weight of vinylpolybutadienes should preferably not be exceeded; preferably, amounts comprised within the range of from 0.1 to 10% by weight are used.

The non-peroxidic initiators which can be used are those suitable for generating free radicals at temperatures within the range from 200° C. to 350° C. preferably from 220° C. to 300° C. Examples of such compounds are the alkyl derivatives of 1,2-diphenyl-ethane disclosed in U.S. Pat. No. 4,666,947; silylbenzopinacoles disclosed in U.S. Pat. No. 4,948,820.

Good results are obtained in particular with the use of 2,3-dimethyl-2,3,-diphenylbutane (Interox CCDFB - Peroxyd Chemie) and the oligomers of 1,3-and 1,4-diisopropylbenzene.

As antioxidant stabilizers, all the conventional antioxidant agents can be used which are suitable for preventing the thermal degradation of macromolecules due to self-oxidation side reactions.

In particular, the sterically hindered phenols, preferably (2,6)-di-tert.-butyl-p-cresol (BHT), secondary aromatic amines, thioethers, phosphites, phosphonites, zinc dithiobutylcarbamate, and their mixtures, can be cited herein.

Furthemore, also synergistic combinations of BHT with 2,2'-thio-diethyl-bis [3-(3,5-tert.-butyl-4-hydroxyphenyl)-propanoate and/or with phosphites and phosphonites, in particular tetra-bis(2,4-di-tert.-butylphenyl)-4,4'-diphenylphosphonite, can be advantageously used.

Antioxidants are used in total amounts which generally are not higher than 2% by weight, and preferably are included within the range from 0.1 to 1%, based on polymer weight.

In addition to antioxidants, also light stabilizers can be used, which comprise, for instance, 2-(2'-hydroxyphenyl)-benzotriazoles, 2-hydroxy-4-alkoxybenzophenols, sterically hindered amines (HALS), and other. Also other additives suitable for improving the rheologic properties of the reaction mixture (lubricants) or the crystallinity of the manufactured article (nucleants) can be advantageously used.

Furthermore, other additives can be used in order to confer adequate mechanical properties, such as, e.g., talc, mica, calcium carbonate, and so on, as well as reinforcing agents, such as fiberglass and others, and flame retardants agents.

The treatment according to the invention is carried out by heating the polymer admixed with the antioxidants, the non-peroxidic initiator, and vinyl polybutadiene, at temperatures included within the range from 200° C. to 350° C. and preferably from 200° C. to 300° C. for a time usually within the range from 0.1 to 20 minutes, preferably from 0.5 to 10 minutes, by operating in a usual closed mixer (for example of Banbury type), or, preferably, in a screw extruder or compounding unit.

Vinylpolybutadienes can be added either, suitably dissolved in an organic solvent, together with the non-peroxidic initiator, directly to the (co)polymer, or as concentrated masterbatch, together with the (co)polymer to be rearranged.

The pelletization of the modified can be carried out.

According to another form of practical embodiment, the non-peroxidic free-radical initiators, as well as the antioxidants, are preliminarily added during the (co)polymers synthesis in the step of the monomer polymerization in liquid phase. The (co)polymer obtained in that way is then admixed with polybutadiene-1,2 and submitted to the rearrangement reaction.

According to a further form of practical embodiment, the rearrangement reaction can be carried out during the step of injection-moulding.

The following examples are supplied in order to illustrate the invention, without limiting it.

EXAMPLE 1 (Reference Example)

500 part by weight of crystalline polypropylene with melt flow index=0.3 dg/min (according to ASTM 1233-73 condition L) produced by HIMONT ITALIA (trade name MOPLEN "SPHERIPOL" YD 50 G) is uniformly mixed for a half-minute time period in a Henschel turbomixer with 0.5 parts by weight of BHT, 0.5 parts by weight of sulphur containing phenolic antioxidant (IRGANOX 1035 made by CIBA GEIGY), and furthermore with 0.5 parts by weight of calcium stearate.

Finally, 3 parts by weight of a non-peroxidic free-radical initiator consisting of 2,3-dimethyl-2,3-diphenyl-butane (Interox CCDFB made by PEROXID-CHEMIE A.G.) is added.

The compound is then fed to the hopper of a singles crew extruder of Dolci type, with the screw having a diameter of 45 mm.

The compound is then extruded at a head temperature of 289° C.–290° C., with a flow rate of approximately 10 kg/hour, a revolving speed of 50/60 rpm, and a stay time of about 200 seconds.

Pelletization is finally performed, and from the resulting pellets normalized bars are manufactured with a thickness of 3 mm, by injection-moulding in a Negri - Bossi Press 225–640 N (equipped with a 50-mm diameter barrel and a free nozzle), by operating at a temperature (of the molten polymer) of 230° C.–240° C., and at the specific pressure of 980 bars.

The mould is kept at the constant temperature of 30° C. Some of the specimens obtained in that way are re-ground and submitted to MFI determination, the other specimens are subsequently submitted to the test for notched Charpy impact strength, according to ASTM D 256, at 23° C.

For the determination of total energy at break, the ball drop method was adopted.

To that purpose, discs were injection-moulded with a diameter of 100 mm and a thickness of 3 mm. The test was performed by operating with a ball of 20 mm of diameter, with a free opening diameter of the support of 60 mm and impact speed of 5 m/second, with the instrumentation being in compliance with DIN 53 443 standard 2nd part.

In Table 1, values of melt flow index and impact strength after degradation processing are reported. It is evident that to a considerable increase in MFI (from 0.3 to 20 dg/min) caused by the degradation corresponds remarkable decay of impact strength mechanical properties.

EXAMPLE 2

5 parts by weight of liquid vinylpolybutadiene, having a number average molecular weight of 2,600, a viscosity at 25° C. of 85 Poises, manufactured by Revertex Ltd., and marketed under the trade name LITHENE PH, is added to the composition disclosed in Reference Example 1. The extrusion and pelletization are then carried out by operating according to Example 1.

From Table 1, it can be seen that the MFI values of the rearranged polymer have increased more than 20 times, in comparison with the starting propylene polymer (from 0.3 to 8 dg/min), and, surprisingly, the value of the notched Charpy impact strength (14.9 $KJ/m^2$) is definitely higher than in Reference 1 (2.7 $KJ/m^2$); likewise the value of the total absorbed energy in the Ball Drop impact strength test (15.3 J/mm) is much higher than in Reference 1 (0.71 J/mm) even overcoming the value of matrix polymer MOPLEN YD "SPHERIPOL" 50 G, (7.9 J/mm).

EXAMPLE 3 (Reference Example)

A sample of 5kg of pellets of isotactic polypropylene, marketed under the trade name MOPLEN X 30 G by Himont Italia, having a melt flow index (MFI) at 230° C. and 21.6 N=6–8 dg/min, is submitted to injection moulding by operating at a temperature of 230°–240° C. Bars with standard dimensions obtained in that way with a thickness of 3 mm are submitted to the test for notched Charpy impact strength.

The determination of total energy at break is carried out on discs with 100 mm of diameter and 3 mm of thickness.

EXAMPLE 4

5 kg of isotactic polypropylene in powder form MOPLEN YD 50 G is mixed in a Henschel turbomixer with 0.1% by weight of BHT and 0.1% weight of IRGANOX 1035.

Then 0.6% by weight of INTEROX CCDFB activator, 0.1% by weight of calcium stearate and finally 1.0% by weight of LITHENE PH are added.

The resulting compound is then injection moulded at a temperature of 280°–290° C. On the specimens obtained in that way the melt flow index, impact strength and total energy at break are measured.

As it can be seen from Table 1, polypropylene rearranged according to the present example shows, MFI being the same, a notched Charpy impact strength value more than twice as high as of the reference sample (Reference Example 3), and on impact strength value by the Ball Drop method, 10 times as high as of reference sample.

EXAMPLE 5

To 95 parts by weight of MOPLEN YD 50 G, 5 parts by weight of a masterbatch in pellet form comprising 12 parts by weight of INTEROX CCDFB initiator, 88 parts by weight of MOPLEN YD 50 G., 0.1 parts by weight of BHT, 0.1 parts by weight of IRGANOX 1035, AND FINALLY 0.1 parts by weight of calcium stearate are added.

The compound is then extruded at 280°–290° C., and pelletized.

To the pelletized polymer with MFI of approximately 20 dg/min, 1 p.h.r. (parts per hundred parts of resin) of liquid 1,2-polybutadiene (LITHENE PH) is uniformly added, and specimens are produced by injection moulding at a temperature of 230°–240° C.

As shown in Table 1, the value of notched Charpy impact strength has increased from 4.7 to 7.9 KJ/m$^2$, and the energy at break has increased as well, on an average, from 1.2 up to 19.5 J/mm.

EXAMPLE 6

100 parts by weight of crystalline polypropylene marketed as VALTEC HLOO1D by Himont Italia, having a value of MFI at 230° C and 21.6 N=0.3 dg/min is intimately mixed in a common tumbler mixer with 0.1% by weight of a sulphur containing phenolic antioxidant (IRGANOX 1035 ex Ciba Geigy), constituted by 2,2-thiodiethyl-3-(3,5-di-tert.-butyl-4-hydroxyphenyl) propanoate.

Then, 0.6% by weight of a non-peroxidic free radical activator constituted by 2,3-dimethyl-2,3-diphenyl-butane (marketed as INTEROX CCDFB ex Peroxid Chemie G.m.b.H), and 0.1.% by weight of calcium stearate and, finally, 1% by weight of α, ω-polybutadiene diol, marketed by Krahn Chemie G.m.b.H under the trade name Liquiflex H and having an average molecular weight of 2,800 a maximum viscosity at 25° C. of 70 Poises, a hydroxy content of 0.700–0.800 meq/g, are added.

The resulting compound is then extruded at 280° C. and subsequently pelletized.

From the polymer functionalized by rearrangement, after injection moulding at 240° C., specimens are obtained which, as shown in Table 1, display a 10 times as hight MFI value; in fact, said value is increased from 0.3 to 3; also the measured value resulting from Ball Drop impact strength test is twice as high.

EXAMPLE 7

100 parts by weight of a random ethylene-propylene copolymer, with an ethylene content of 5% by weight, manufactured in pellet form by Himont Italia and marketed under the trade name MOPLEN EPD 60 R, having an MFI at 230° C. and 21.6 N=0.35 dg/min, is mixed in a tumbler mixer with 0.1% of BHT antioxidant, together with 0.1% of antioxidant IRGANOX 1035 and 0.1% of calcium stearate as lubricant. Then, 0.6% by weight of non-peroxidic free radical activator constituted by 3,4-dimethyl-3,4-diphenil-hexane, marketed by Peroxid-Chemie A.G. under the trade name INDEROX CCDFH, is added. Finally, to the composition 1 part by weight of LITHENE PH is added.

The end composition is then submitted to extrusion at 290° C., in order to rearrange the polymer.

The copolymer, having an MFI value at 230° C./2.16 N=10 dg/min is then submitted to compression moulding at 240° C., and then on the resulting specimens the Charpy impact strenght determination at 23° C. is carried out.

The values of impact strength are reported in Table 1, from which it results that the rearranged copolymer displays a considerable increase in fluidity (MFI) over the copolymer in pristine state, and furthermore is also characterized by an improved impact strenght, with a value of total energy at break at the Ball Drop test of 28.7 J/mm as compared to non-rearranged sample, showing a value of 13.5 J/mm.

TABLE 1

| Example No. | Melt flow index at 230° C./21.6 N ASTM D 1238 h dg/min | Notched Charpy impact strength at 23° C. (ASTM D 256): energy at break/cross-section surface area unit, KJ/m$^2$ | Impact strength by Ball Drop: average energy at break J/mm |
| --- | --- | --- | --- |
| Reference 1 | 20 | 2,7 | 0.71 |
| 2 | 8 | 14.9 | 15.3 |
| Reference 3 | 8 | 4.7 | 1.2 |
| 4 | 8 | 10.6 | 12.1 |
| 5 | 7.5 | 7.9 | 19.5 |
| 6 | 3 | 5.2 | test not performed |
| 7 | 10 | test not performed | 28.7 |

We claim:

1. An uncrosslinked graft (co)polymer obtained by grafting vinyl polybutadiene having at least 10% of units with 1, 2 configuration onto a propylene (co)polymer in the presence of a non-peroxidic initiator.

2. The graft (co)polymer of claim 1, wherein the graft (co)polymer has 0.5–10% by weight of the grafted vinyl polybutadiene.

3. The graft (co)polymer of claim 2, wherein the vinyl polybutadiene contains 10–90% of units with 1, 2 configuration.

4. The graft (co)polymer of claim 2, having an isotacticity index higher than 80%.

5. The graft (co)polymer of claim 4, having a value of MFI at 230° C./21.6 N higher than 3 and a value of notched Charpy impact strength higher than 4 KJ/m$^2$.

6. The graft (co)polymer of claim 1, wherein the vinyl polybutadiene also contains functional groups in the chain-end positions and/or distributed along the polymer chain.

7. The graft (co)polymer of claim 6, wherein the vinyl polybutadiene is selected from the group consisting of polybutadiene-diols and polybutadienes containing carboxy, ester or epoxy groups distributed along the polymer chain.

* * * * *